(12) United States Patent
Tanaka

(10) Patent No.: US 6,694,395 B1
(45) Date of Patent: Feb. 17, 2004

(54) INFORMATION PROCESSING UNIT WITH A PLURALITY OF INPUT/OUTPUT PROCESSORS

(75) Inventor: Atsushi Tanaka, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 375 days.

(21) Appl. No.: 09/594,045

(22) Filed: Jun. 15, 2000

(30) Foreign Application Priority Data

Jun. 16, 1999 (JP) .............................. 11-169313

(51) Int. Cl.[7] .................... G06F 13/00; G06F 11/00
(52) U.S. Cl. .................... 710/100; 710/316; 714/13; 714/43
(58) Field of Search .................... 710/100, 305, 710/306, 312, 316, 317; 714/13, 43

(56) References Cited

U.S. PATENT DOCUMENTS

| | | | | |
|---|---|---|---|---|
| 4,542,507 A | * | 9/1985 | Read .................... | 371/22 |
| 5,680,326 A | * | 10/1997 | Russ et al. .................... | 714/4 |
| 6,073,251 A | * | 6/2000 | Jewett et al. .................... | 714/7 |
| 6,148,410 A | * | 11/2000 | Baskey et al. .................... | 714/4 |

\* cited by examiner

*Primary Examiner*—Tim Vo
(74) *Attorney, Agent, or Firm*—Antonelli, Terry, Stout & Kraus, LLP

(57) ABSTRACT

The present invention provides an information processing device allowing continued use of input/output processors even if a non-recoverable major fixed failure takes place in a common control unit connected to a plurality of input/output processors or a common control unit is to be replaced while the system is running. In an information processing device, a plurality of input/output processors is connected to a system control unit via a plurality of common control units. The plurality of common control units and at least one instruction processor are connected to a main memory device via the system control unit. A plurality of information paths are provided so that each input/output processor is connected, to at least two different common control units.

7 Claims, 4 Drawing Sheets

INFORMATION PROCESSING UNIT WITH A PLURALITY OF INPUT/OUTPUT PROCESSORS

BACKGROUND OF THE INVENTION

The present invention relates to an information processing device with a plurality of input/output processors.

The following is a description, with references to FIG. 1, of a conventional information processing system with an information processing devices 1 and an input/output device group 2. The information processing device 1 is formed from a central processing device 4 and a main memory device 9. The input/output device group 2 is connected via a channel system 3 to the central processing device 4 and the main memory device 9. FIG. 2 shows the details of the architecture of the information processing device 1. The channel system 3 is formed from input/output processors 31–38. The central processing device 4 is formed from: common control units 41, 42; instruction processors 71–73; and a system control unit 60. Any number of these structural elements may be used. The common control units 41, 42 are connected to the system control unit 60 via information paths 41a, 42a respectively. The instruction processors 71–73 are connected to the system control unit 60 via information paths 71a–73a. The system control unit 60 is connected to the main memory device 9 via an information path 60a. The common control units 41, 42 transfer main memory access (write/read) requests from the input/output processors 31–38 to the system control unit 60 and sends the responses (e.g., main memory data) from the system control unit 60 to the input/output processors 31–38. The common control units 41, 42 transfer control information (e.g., interrupts) from the input/output processors 31–38 to the instruction processors 71–73 and transfers control information (e.g., activation requests) from the instruction processors 71–73 to the input/output processors 31–38.

In the conventional technology, single information paths 31a–38a serve as the information paths connecting the input/output processors 31–38 to the common control units 41, 42.

If there is a major failure in the common control unit 41, the common control unit 41 notifies the input/output processors 31–34 that a failure has occurred and failures are reported to software, e.g., the operating system, regarding all I/O operations being performed by the input/output processors 31–34.

The conventional technology has the following problems.
(1) If a major fixed failure takes place in the common control unit 41 and resumption of operations is not possible, the input/output processors 31–34 are no longer usable. If the input/output processors 31–34 become unusable, continued system operation may become difficult or the operating range may be reduced.
(2) A technology is available (hereinafter referred to as in-operation maintenance) in which, when a localized fixed failure occurs in a system and operations are continued with one section disabled, the hardware parts (generally a package or module on which parts are mounted) containing the failed section are replaced to recover the fixed failure section. If a localized fixed failure takes place in the common control unit 41 and the system is operating with the section disabled, replacing the common control unit 41 while the system is operating will prevent the input/output processors 31–34 from being used, thus making continued operation of the system difficult or reducing the operating range
(3) I/O operation retry features are provided in software, e.g., the operating system. If a major failure takes place in the common control unit 41, the failure is reported by the common control unit 41 to the input/output processors 31–34. Failure reports Care then sent to software, e.g., the operating system, regarding all I/O operations that were being processed by the input/output processors 31–34. This may result in multiple I/O operation retries that can cause a temporary shutdown of on-line operations.

SUMMARY OF THE INVENTION

The object of the present invention is to provide an information processing device that allows continued use of input/output processors even if a major fixed failure takes place in a common control unit and restoration is not possible.

Another object of the present invention is to provide an information processing unit that allows continued operation of a system even when a common control unit is replaced while the system is running.

Yet another object of the present invention is to provide an information processing device that can prevent temporary shut-downs of on-line operations caused by multiple retries of I/O operations when a failure takes place in the common control unit.

The present invention provides an information processing device in which a plurality of input/output processors is connected to a system control unit via a plurality of common control units. The plurality of common control units and at least one instruction processor are connected to a main memory device via the system control unit. A plurality of information paths is provided to connect each input/output processor to at least two different common control units.

Furthermore, in the present invention the input/output processor includes: means for storing commands issued to a common control unit and waiting for a response; and means for failure processing performing failure processing only for commands waiting for responses when a failure takes place in a common control unit.

DESCRIPTION OF THE PREFERRED EMBODIMENTS

Figure 1:
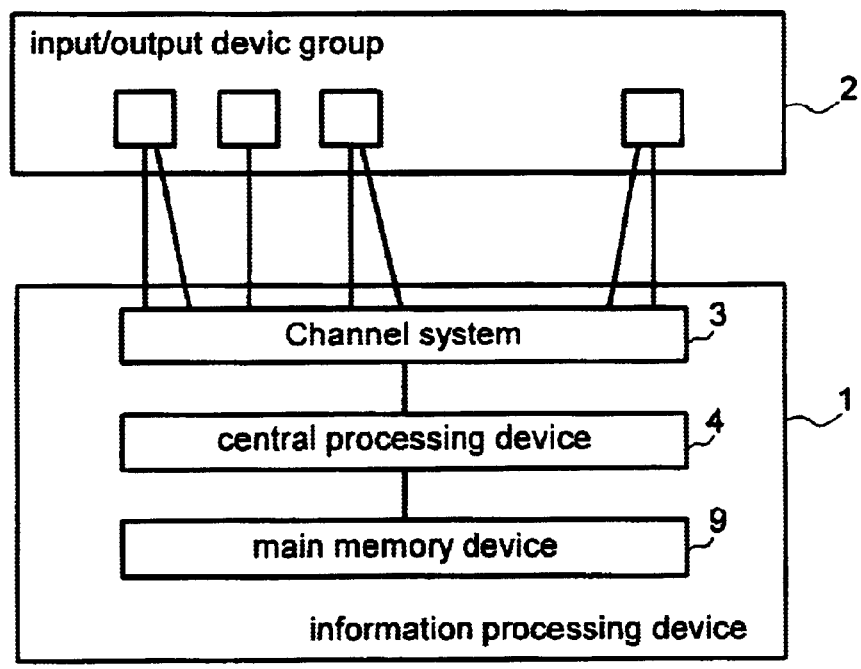
FIG. 1 is a drawing showing the structure of a conventional information processing system.
Figure 2:
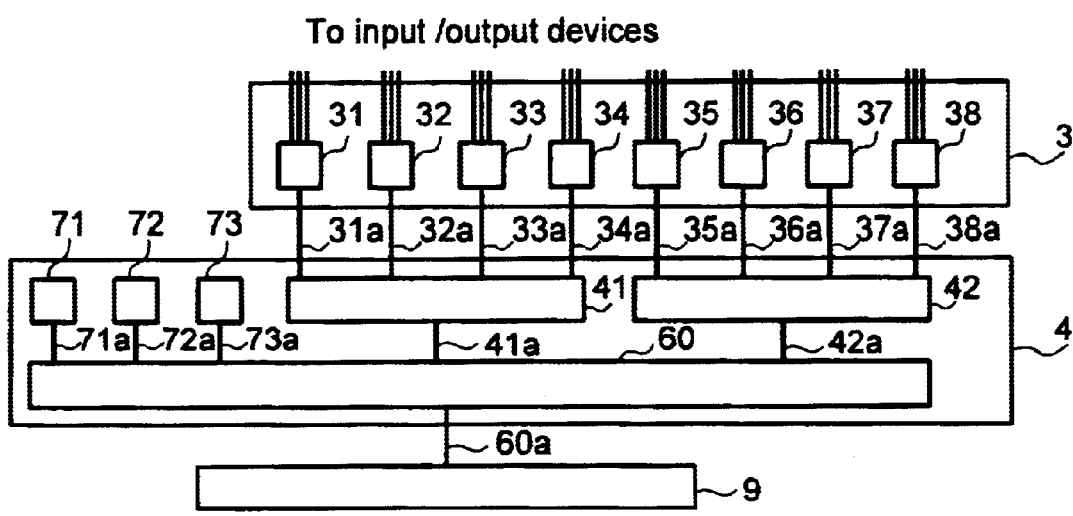
FIG. 2 is a drawing showing the structure of a conventional information processing device.
Figure 3:
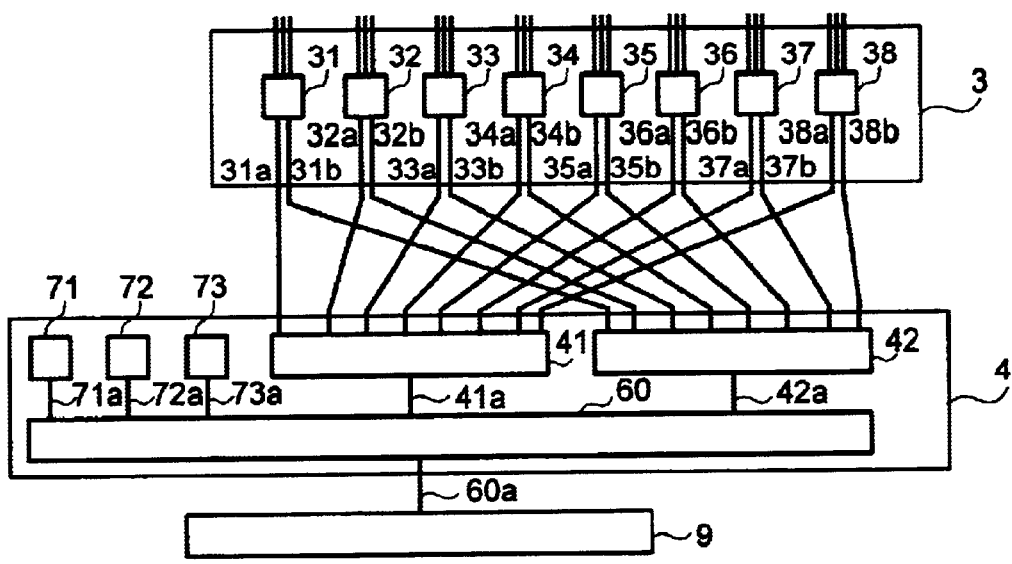
FIG. 3 is a drawing showing an embodiment of the present invention.

FIG. 3 shows an embodiment of the present invention. Input/output processors 31–38 are connected to a common control unit 41 via information paths 31a–38a and are connected to a common control unit 42 via information paths 31b–38b. If a non-restorable major fixed failure takes place in the common control unit 41, the system can continue operating since the input/output processors 31–38 are connected to the common control unit 42 via the information paths 31b–38b. If a non-restorable major fixed failure takes place in the common control unit 42, the system can continue operating since the input/output processors 31–38 are connected to the common control unit 41 via the information paths 31a–38a. If the common control unit 41 is replaced while the system is running, the input/output processors 31–38 are linked to the common control unit 42 via the information paths 31b–38b so that the system can continue operations. If the common control unit 42 is replaced while the system is running, the input/output processors 31–38 are linked to the common control unit 41 via the information paths 31a–38a so that the system can continue operations.

Figure 5:
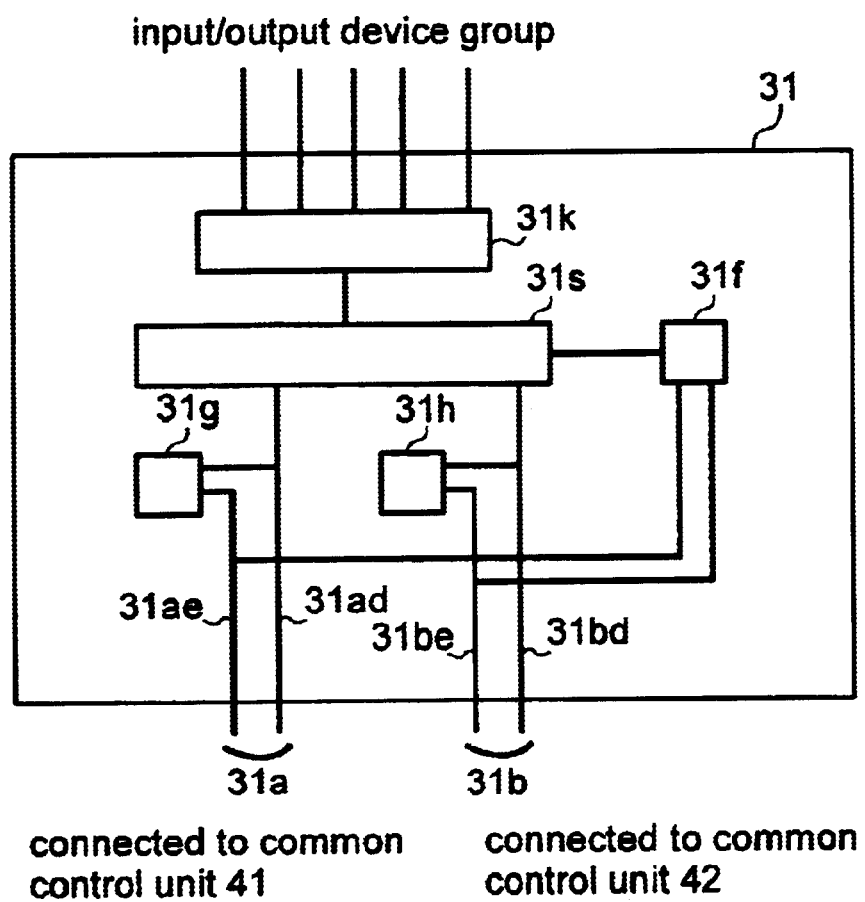
FIG. 5 is a drawing showing the details of an input/output processor from FIG. 3.
Figure 7:
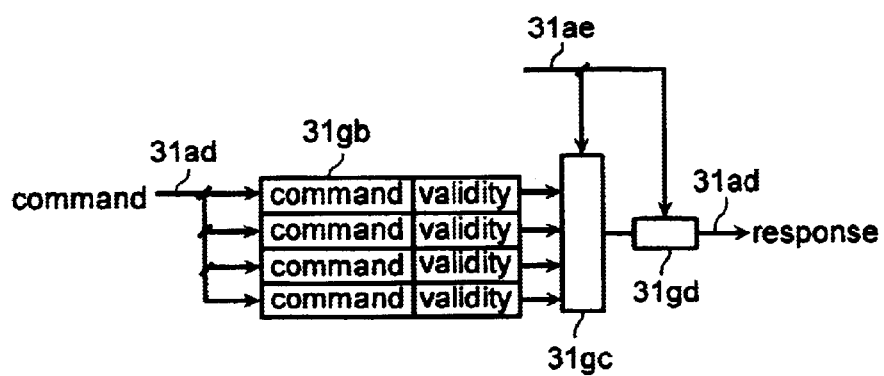
FIG. 7 is a drawing showing the details of command failure processing section of an input/output processor from FIG. 5.

FIG. 5 is a drawing showing the details of the input/output processor 31 from FIG. 3. An input/output control section 31k is connected to an input/output device group 2 to provide activation control, data transfer control, and the like to the individual input/output devices. The input/output control section 31k is connected via a switch 31s to the common control unit 41 and the information path 31a, and is connected to the common control unit 42 via the information path 31b. A switch control section 31f selects between the information path 31a and the information path 31b. The information path 31a is formed from a command/response path 31ad and a failure report path 31ae, and the information path 31b is formed from a command/response path 31bd and a failure report path 31be. The command/response path 31ad is used for information identifying the command source, the types of commands, main memory addresses, and main memory data. The failure report path 31ae is used for sending failure reports from the common control unit 41 to the input/output processor 31. The switch control section 31f monitors the status of the common control units 41, 42 via the failure report paths 31ae, 31be, and instructs the switch section 31s to switch information paths if a failure has taken place. The command failure processing section 31g stores commands issued by the input/output processor 31 to the common control unit 41, monitors responses from the common control unit 41, and, if a failure in the common control unit 41 is reported, reports on the commands for which no response has been sent to the input/output control section 31k via the switch section 31s. FIG. 7 is a drawing showing the details of the command failure processing section 31g for FIG. 5. The command failure processing section 31g includes a buffer 31gb containing command data and validity bits. When the input/output processor 31 issues a command to the common control unit 41, the command is saved in the buffer 31gb and the validity bit is set to '1'. If a response has been sent from the common control unit 41 to the input/output processor 31, the validity bit, is set to '0'. When a failure in the common control unit 41 is reported via the failure report path 31ae, the selector 31gc selects command data having the validity bit set to '1' from the buffer 31gb. A failure report is generated by the failure report generating section 31gd, and the failure is reported to the input/output control section 31k via the switch section 31S. If a failure takes place in the common control unit 41, this feature allows the influence of the failure to be reduced by performing failure-response operations only for the non-responsive commands rather than all the operations of the input/output processor 31.

Figure 4:
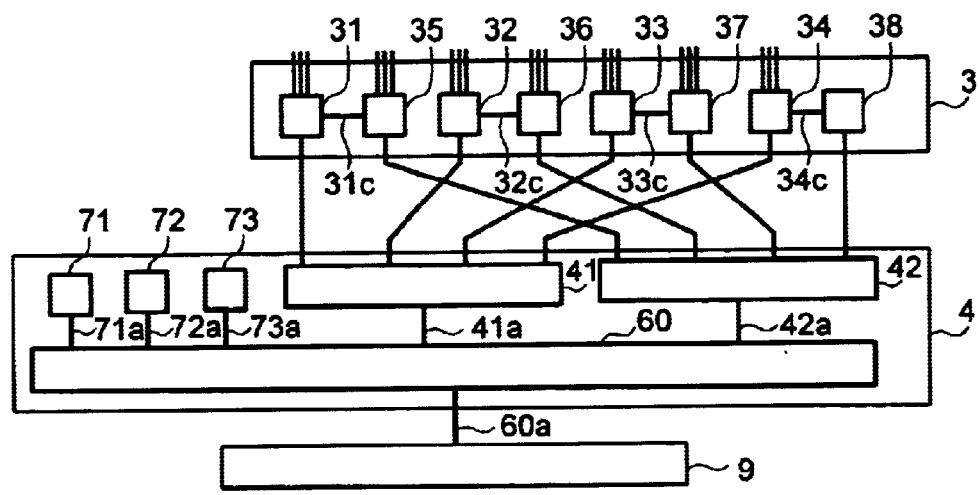
FIG. 4 is a drawing showing another embodiment of the present invention.

FIG. 4 shows another embodiment of the present invention. The input/output processors 31–34 are connected to the common control unit 41 via the information paths 31a–34a. The input/output processors 35–38 are connected to the common control unit 42 via the information paths 35a–38a. Information paths 31c–34c connect the input/output processors 31, 35, the input/output processors 32, 36 the input/output processors 33, 37, and the input/output processors 34, 38, respectively. Normally, the input/output processors 31–34 connected to the common control unit 41 via the information paths 31a–34a, and the input/output processors 35–38 are connected to the common control unit 42 via the information paths 35a–38a. If the major fixed failure of the common control unit 41 cannot be recovered, the input/output processors 31–34 are connected to the input/output processors 35–38 and the common control unit 42 via the information paths 31c–34c, respectively. Thus, even if a non-restorable major fixed failure takes place in the common control unit 41, the input/output processors 31–34 are connected to the common control unit 42 so that the system can continue operating. Similarly, if the common control unit 41 is to be replaced while the system is running, the input/output processors 31–34 are connected to the common control unit 42 so that the system can continue operating. Also, if a non-restorable major fixed failure takes place in the common control unit 42 or if the common control unit 42 is to be replaced while the system is running, the input/output processors 35–38 are connected to the input/output processors 31–34 and to the common control unit via the information paths 31c–34c, respectively.

Figure 6:
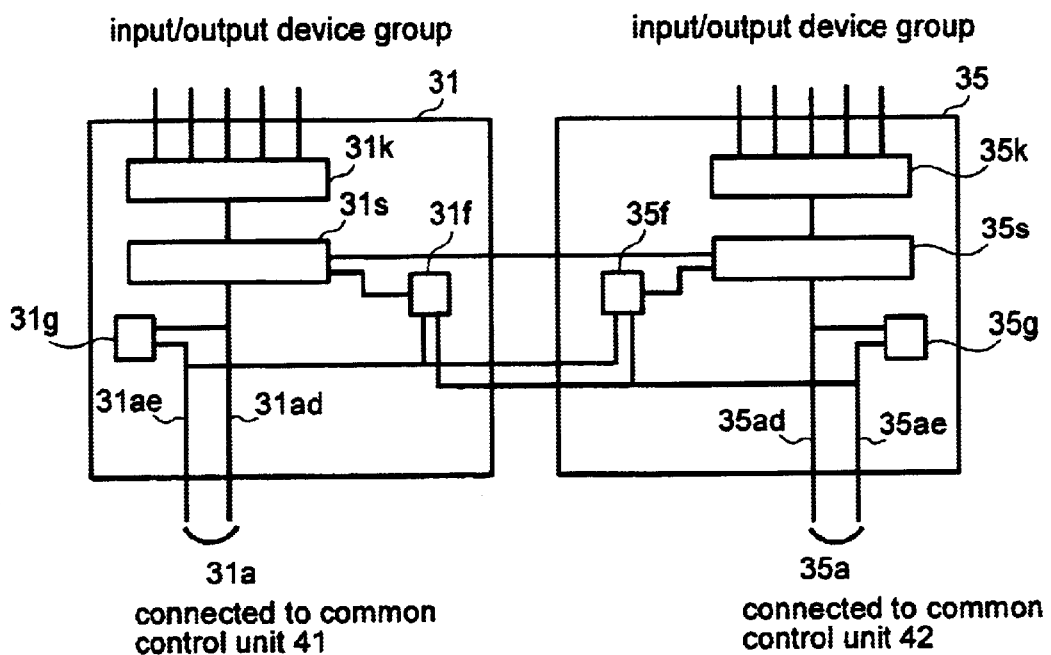
FIG. 6 is a drawing showing the details of an input/output processor from FIG. 4.

FIG. 6 is a drawing showing the details of the input/output processors 31, 35 from FIG. 4. The input/output control sections 31k, 35k are connected to the input/output device group 2 to control activation, data transfer, and the like for each of the input/output devices. The input/output control sections 31k, 35k are connected to the common control units 41, 42 through information paths 31a, 35a via switch, 31s, 35s. Switch control sections 31f, 35f select between the information paths 31a, 35a. The information path 31a is formed from a command/response path 31ad and a failure report path 31ae, and the information path 35a is formed from a command/response path 35ad and a failure report path 35ae. Switch control sections 31f, 35f monitor the status of the common control units 41, 42 via the failure report paths 31ae, 35ae and instructs the switches 31s, 35s to switch information paths if a failure takes place. Command failure processing sections 31g, 35g stores the commands issued by the input/output processors 31, 35 to the common control units 41, 42, monitors responses from the common control units 41, 42, and, if a failure in the common control units 41, 42 is reported from the failure report paths 31ae, 35ae, reports on commands for which responses, have not been sent to the input/output control sections 31k, 35k via switches 31s, 35s. This feature allows the influence of the failure to be reduced if a failure takes place in the common control unit 41, 42 by performing failure-response operations only for the non-responsive commands rather than all the failure operations in the input/output processors 31, 35.

The following is a detailed description of the operations performed if a failure report is sent to the input/output processor 31 via the failure report 31ae. If a failure is reported via the failure report path 31ae, the command failure processing feature shown in FIG. 7 sends to the switch 31s a response with a failure report for the commands that did not get a response from the common control unit 41. Subsequently, when the switch 31s sends a command to a common control unit, either the command/response path 31ad or the command/response path 31c is used. If the command/response path 31ad can be used, then the command/response path 31*ad* is used. If the command/response path 31*ad* cannot be used, the command/response path 31*c* is used. Commands using the, command/response path 31*c* are sent via the switch 35*s* to the common control unit 42. The information indicating the sending source, which is contained in a section of the command, indicates that the input/output control section 31*k* is the sending source. The switch 35*s* identifies the sending source information in the response returned by the common control unit 42 and determines whether to send the response to the input/output control section 35*k* or the switch 31*s*. As described above, the input/output control section 31*k* can send and receive commands to and from the common control unit 42. Since commands/responses from the input/output control sections 31*k*, 35*k* use a single command/response path 35*ad*, there is reduced throughput between the input/output device group 2 and the information processing device 1, but this prevents shutdowns in the input/output processors. Also, since standard operations usually involve a throughput of ½ the maximum throuhput or less, the reduced throughput will rarely be significant. If the command/response path 31*ad* cannot be used and neither the command/response path 31*c* nor the command/response path 35*ad* can be used, then the input/output processor 31 will be shutdown. If the instruction processors 71–73 send control information (e.g., interrupts) to the input/output processor 31, the common control unit 41 will be used if the common control unit 41 is available, and the common control unit 42 will be used if the common control unit 41 cannot be used. Since the control information contains destination information indicating whether the information was issued for the input/output processor 31 or the input/output processor 35, the control information directed to the input/output processor 31 and sent to the common control unit 42 will be sent to the input/output processor 31 via the switch 35*s* in the input/output processor 35.

The present invention can also be implemented for information processing systems in which a plurality of information processing devices is connected to an input/output, device.

In the present invention, a plurality of information paths connects the input/output processors to the common control units. Thus, if there is a major non-recoverable fixed failure in the common control unit 41, the input/output processors 31–34 can be connected to the common control unit 42 to allow the system to continue operating.

Also, if the common control unit 41 is to be replaced while the system is running, the input/output processors 31–34 can be connected to the common control unit 42 to allow the system to continue operating.

Furthermore, in the present invention, commands issued to a common control unit that are waiting for a response are stored in the input/output processor. If a common control unit fails, failure reports are sent to the software, e.g., the operating system, only for I/O operations relating to the commands issued to the common control unit that are waiting for a response. Thus, the influence of the failure can be reduced.

What is claimed is:

1. An information processing device allowing continued operation of a plurality of input/output processors even if a common control unit controlling said plurality of input/output processors becomes inactive, comprising:

a plurality of input/output processors, wherein each of said plurality of input/output processors controls a plurality of input/output devices;

at least two common control units, wherein each of said at least two common control units controls some or all of said plurality of input/output processors; and a system control unit controlling an instruction processor, a main memory, and said at least two common control units;

wherein each of said input/output processor includes a first information path to connect to a first common control unit of said at least two common control units and a second information path to connect to a second common control unit of said at least two common control units, and wherein during normal operation said plurality of input/output processors are divided into a first input/output processors group controlled by said first common control unit via said first information path and a second input/output processors group controlled by said second common control unit via said second information path, and when said first common control unit becomes inactive said first input/output processors group are controlled by said second common control unit via said second information path.

2. An information processing device as described in claim 1, wherein each of said information paths in said input/output processors includes a command/response path for a corresponding common control unit and a failure report path for said corresponding common control unit.

3. An information processing device as described in claim 1, wherein said input/output processor includes an input/output control section controlling activation and data transfer for said input/output device.

4. An information processing device as described in claim 2, wherein each of said plurality of input/output processors includes a switch for selecting a single command/response path from said plurality of command/response paths.

5. An information processing device as described in claim 3, wherein said input/output processor includes a failure processing section processing only commands which have been issued to a common control unit and are waiting for a response.

6. An information processing device as described in claim 4, wherein each of said plurality of input/output processors includes a switch control section instructing said switch to switch command/response paths in response to failure reports from said common control unit.

7. An information processing device as described in claim 5, wherein said failure processing section in said input/output processor includes a buffer storing commands which have been issued to a common control unit and waiting for a response and a failure report generating section issuing failure reports to said input/output control section in response to failures reported from said common control unit.

* * * * *